Dec. 22, 1925.
N. A. SCHWINDEN
1,566,433
ANTISLIPPING TIRE ARMOR
Filed March 10, 1924
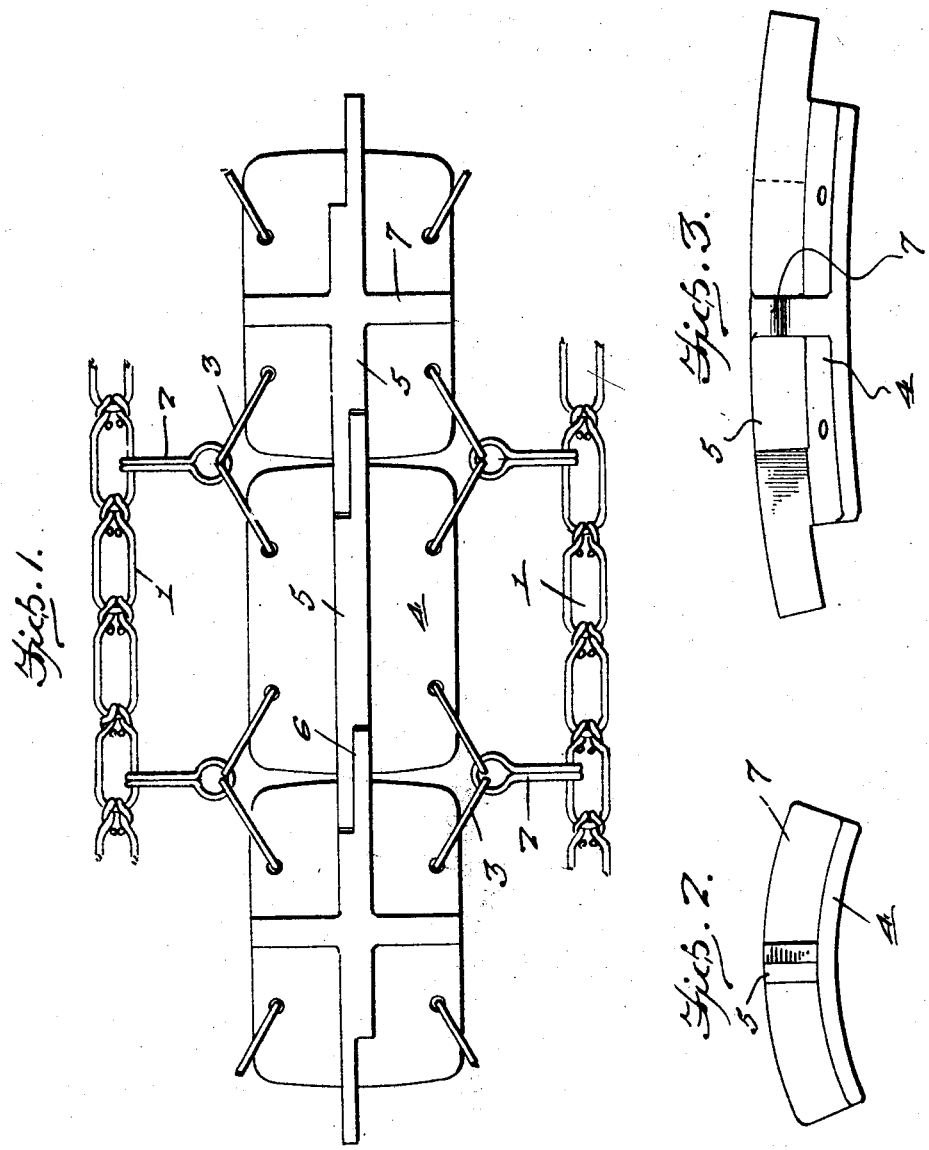
Inventor
N. A. Schwinden
Attorney Patented Dec. 22, 1925.

1,566,433

UNITED STATES PATENT OFFICE.

NICHOLAS A. SCHWINDEN, OF BOISE, IDAHO, ASSIGNOR OF ONE-FOURTH TO GEORGE W. CAREY, OF BOISE, IDAHO, AND ONE-FOURTH TO SALVANUS A. RUSE, OF NAMPA, IDAHO, AND ONE-FOURTH TO HENRY LAFAYETTE TUCKER AND ONE-FOURTH TO OTTO FRED ZURCHER, BOTH OF BOISE, IDAHO.

ANTISLIPPING TIRE ARMOR.

Application filed March 10, 1924. Serial No. 698,198.

*To all whom it may concern:*

Be it known that I, NICHOLAS A. SCHWINDEN, a citizen of the United States, residing at Boise, in the county of Ada and State of Idaho, have invented certain new and useful Improvements in Antislipping Tire Armor, of which the following is a specification.

This invention relates to anti-slipping tire armor and it consists in the novel features hereinafter described and claimed.

An object of the invention is to provide an armor including features and elements which will afford ample traction between the tire and the surface of a roadway to enable an automobile machine to travel in a straight forward direction without permitting the tire to slip upon the surface of the roadway. The device also includes features and elements which will prevent the tire from slipping or skidding sideways upon the surface of the roadway.

With these objects in view, the structure includes plate members adapted to be connected with the side chain sections by means of links so arranged that the plate members are held end to end upon the periphery of the tire. All of the plate members are provided at their outer surfaces with longitudinally disposed ribs and the end portions of the ribs upon one section overlap the end portions of the ribs upon the next adjacent section. Each alternate plate section is provided upon its outer surface with cross ribs.

In the accompanying drawing:—

Figure 1 is a fragmentary plan view of the armor.

Figure 2 is an end view of one of the plate members.

Figure 3 is a side edge view of one of the said plate members.

As illustrated in the accompanying drawing, the armor structure includes side chain sections 1 which are adapted to be applied to the sides of an automobile tire in a usual manner. Inwardly disposed links 2 are connected at intervals with the links of the side chain sections 1 and links 3 are connected with the inner ends of the links 2. There are two links 3 connected to the inner end of each of the links 2. The links 3 upon the same link 2 diverge from each other toward the intermediate portion of the armor structure. Plate members 4 are connected with the inner ends of the links 3 and bridge the space between the links 3 at the opposite side portions of the chain structure. The plate members 4 are curved longitudinally and transversely to fit upon the periphery of the tire. All of the plate members 4 are provided at their outer surfaces and along their median longitudinal dimensions with outstanding ribs 5. The ribs 5 are reduced by rabbeting as at 6 at their ends and at the opposite sides of the said ribs. The end portions of the ribs 5 project beyond the ends of the plate members 4 and the projecting end portions of the rib upon one of the plate members 4 is received in the rabbets 6 of the ribs 5 of the next adjacent plate members 4 whereby the end portions of all of the ribs 5 overlap each other along the median plane of the tire to which the chain is applied. Each alternate plate member 4 is provided upon its outer surface with cross ribs 7 and the cross ribs 7 are disposed at right angles to the ribs 5 and located midway between the ends of the ribs 5.

By such arrangement, the cross ribs 7 will afford ample traction between the tire and the surface of the roadway to enable the automobile to proceed in a straight forward direction without danger of the tire slipping upon the surface of the roadway. The longitudinally disposed ribs 5 will prevent the tire and the wheel from slipping or skidding sideways upon the surface of the roadway.

Having described the invention, what is claimed is:

A device of the class described including a plurality of plates shaped to fit about the outside of a tire in end to end relation, and provided on their outer surfaces with longitudinally extending ribs projected beyond the ends thereof, the projected portions being reduced for overlapping the next adjacent plates and lying alongside of each other, and being separate so as to be movable in relation to each other, and flexible means connecting the plates.

In testimony whereof I affix my signature.

NICHOLAS A. SCHWINDEN.